United States Patent Office 3,555,655
Patented Jan. 19, 1971

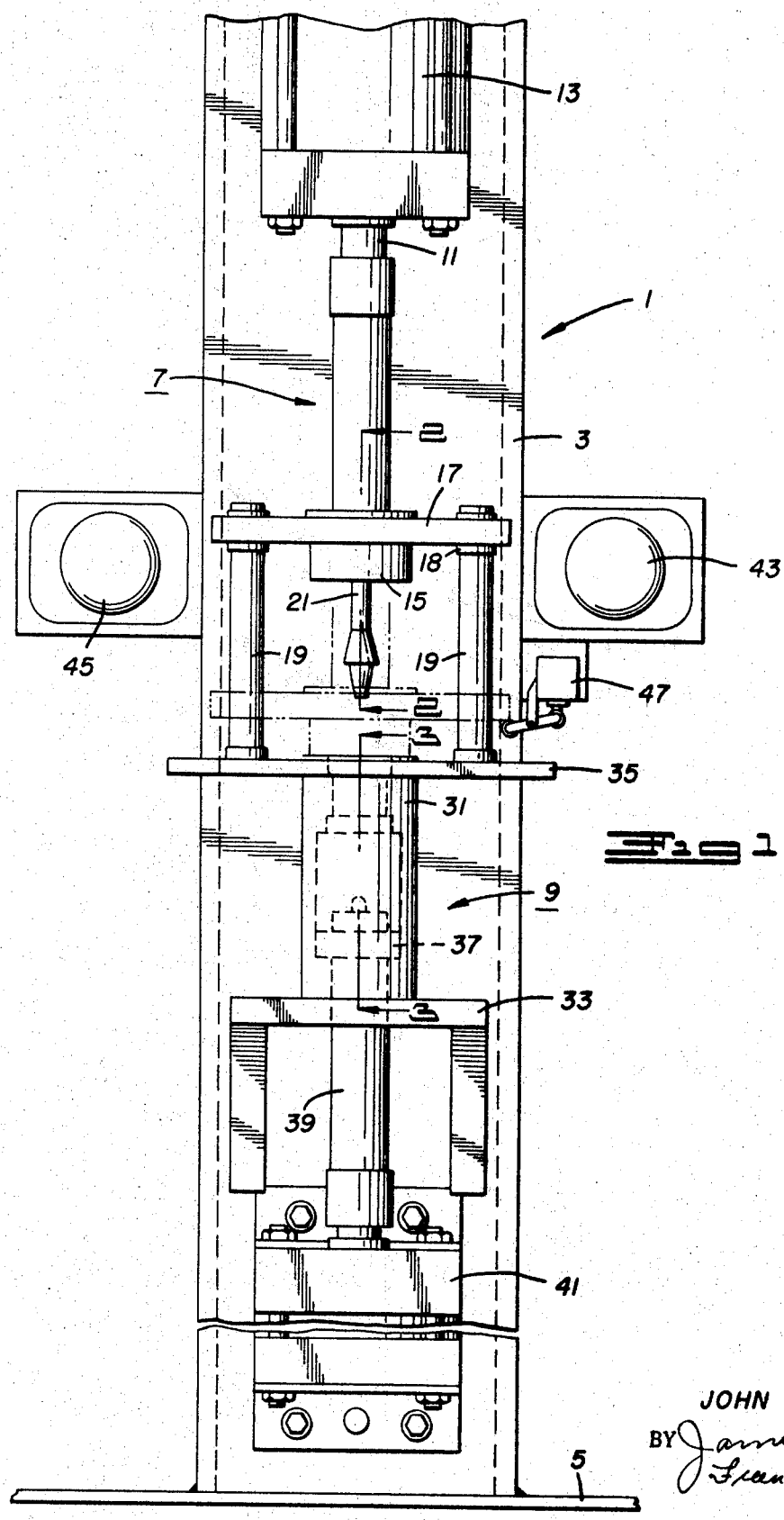

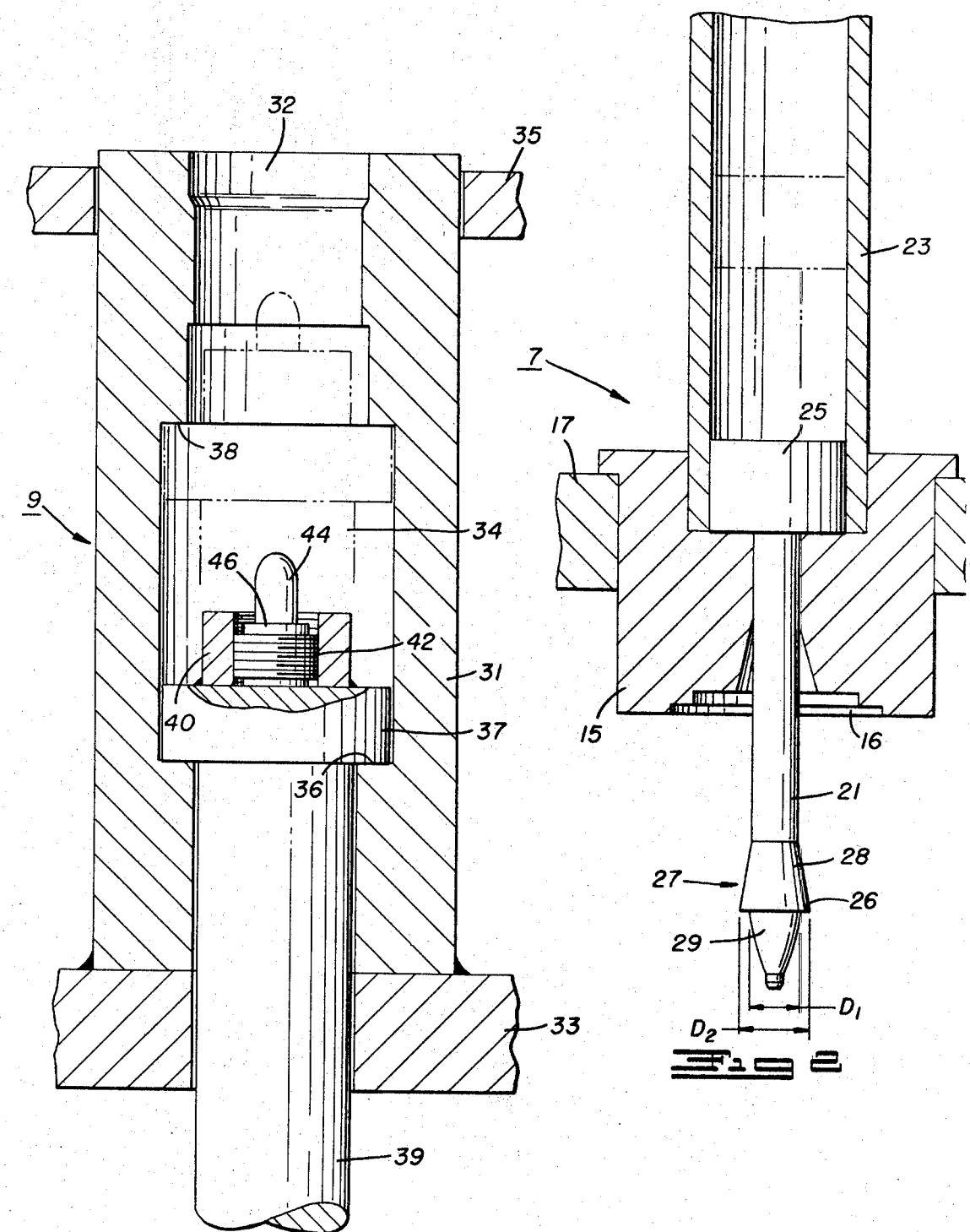

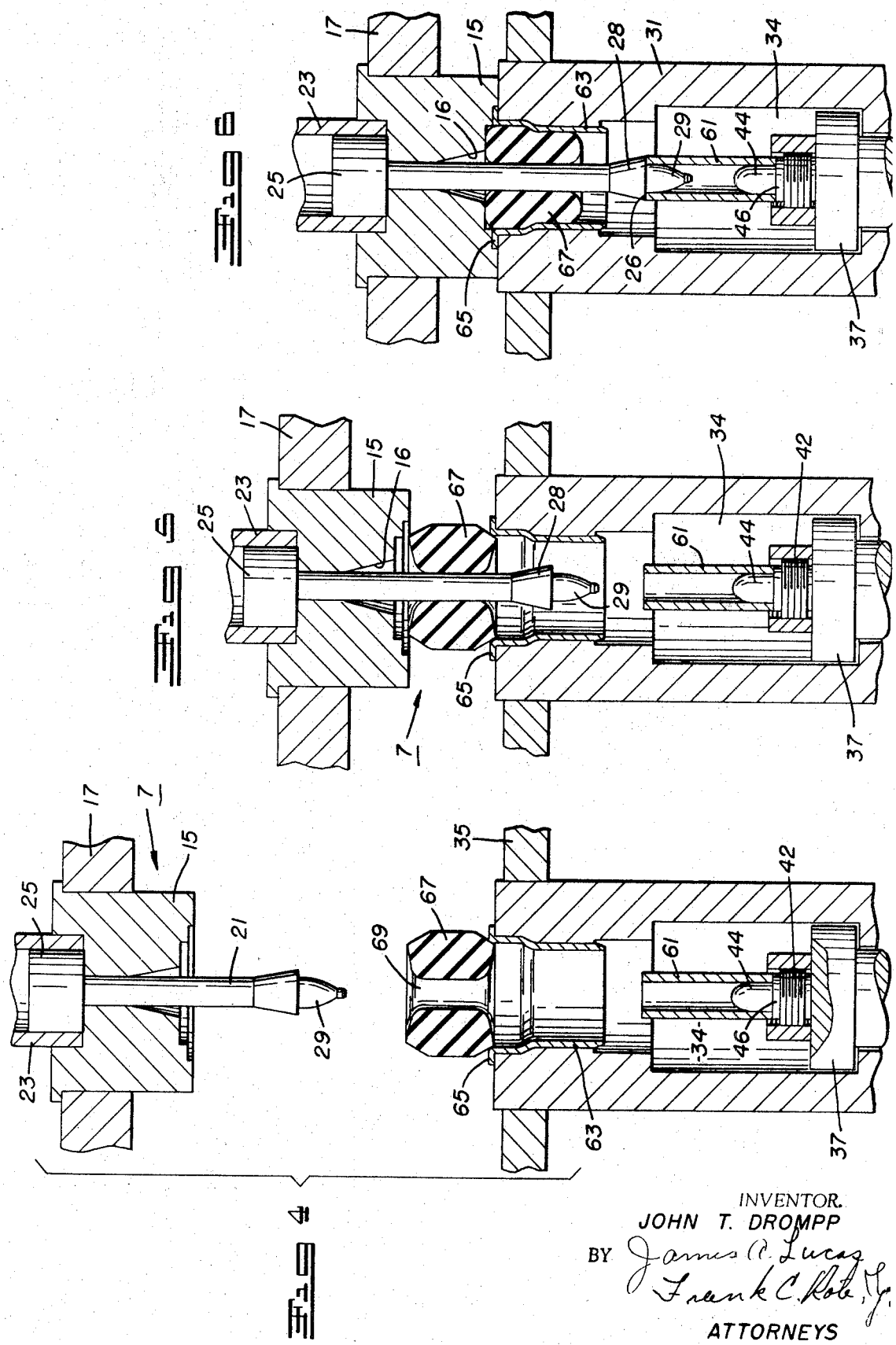

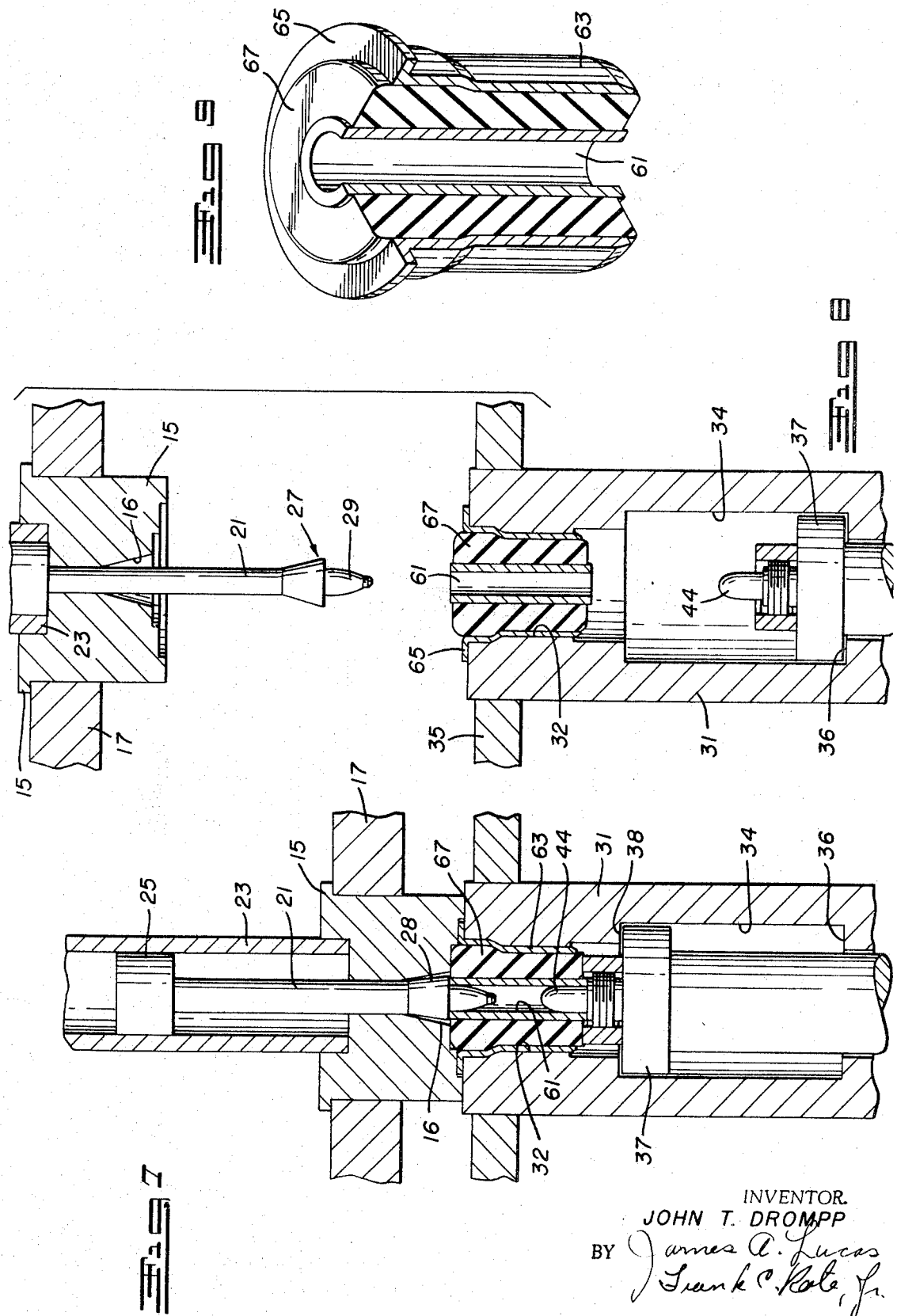

3,555,655
BUSHING ASSEMBLY MACHINE
John T. Drompp, Logansport, Ind., assignor to The General Tire & Rubber Company, a corporation of Ohio
Filed Mar. 25, 1968, Ser. No. 715,809
Int. Cl. B23p 19/02
U.S. Cl. 29—235                                    12 Claims

ABSTRACT OF THE DISCLOSURE

Resilient bushings, of the type wherein a molded annular elastomeric insert is held under radial compression between a pair of concentric, axially aligned sleeves, are assembled with an apparatus utilizing a mandrel assembly and a nesting assembly axially aligned with one another. The entire mandrel assembly is vertically movable and comprises an elongated mandrel one end of which is connected to a piston that is vertically movable within a first pneumatic or hydraulic cylinder independently of the remainder of the mandrel assembly. The free end or head of the mandrel consists of a tapered tip, joined to a flared, frusto-conical skirt, the juncture forming an abutment shoulder. The nesting assembly contains a nest to hold the outer metal sleeve and a positioning pin to locate the inner sleeve in axial alignment with but below said outer sleeve. During assembly, the insert is placed on top of the outer sleeve after which the mandrel assembly moves downwardly to urge the head of the mandrel through the annulus within said insert and to force the insert into the outer sleeve. The tip of the mandrel comes to rest in the inner sleeve with the shoulder abutting the end of the sleeve after which the mandrel and inner sleeve are simultaneously drawn upwardly into the insert and the mandrel removed to complete the assembly.

BACKGROUND OF THE INVENTION

Bushings of the type wherein an annular rubber insert is held between a pair of concentric sleeves have been in use for many years. They are found in a wide variety of applications wherein it is desired to interconnect two relatively movable components while providing isolation of vibration, shock and noise between them. In a typical installation, one of the components, such as a pin or bolt, passes through and is connected to the inner member while the second component such as an annular housing or the like is joined to the outer sleeve. The relative axial, lateral and rotational movement between the two components is then accommodated by the rubber.

One method of increasing the load bearing capacity and lifetime of bushings of this type is to radially compress the rubber between the inner and outer sleeves. In this type of bushing, which is commonly referred to as a Silentbloc bushing, the molded rubber insert is cured before assembly as opposed to the earlier bushings where curing took place after assembly. With the cured rubber held in place under radial compression, the restorative tendencies of the rubber help to prevent slipping between the insert and the sleeves. An adhesive can be used to bond the insert to either or both of the sleeves to further increase the resistance to slipping.

Several types of machines have been developed for the assembly of bushings particularly of the Silentbloc type. Examples of these machines are shown in U.S. Pats. No. 2,684,524, No. 2,872,727, and No. 2,877,543, all owned by the assignee of the present invention. These prior art machines typically utilize a floating mandrel which must be manually positioned in a suitable holder before each assembly operation. At the start of the assembly operation, the rubber insert is normally located between, and in axially spaced alignment with, the inner and outer sleeves. In U.S. 2,877,543, the mandrel is placed on the inner sleeve which is then forced up through the insert to form a subassembly which is then fed through the outer sleeve by appropriate means. The mandrel is then manually removed from the assembly in preparation for the next assembly operation. This manual operation is inefficient and presents definite safety hazards.

SUMMARY OF THE INVENTION

One of the objects of the present invention is the production of bushings using a specially designed mandrel that is permanently connected to the assembly machine.

Another object is the simplification in the assembly of Silentbloc bushings through the use of a permanently attached mandrel.

Yet another object is a bushing assembly machine which readily lends itself to a high degree of automation.

BRIEF DESCRIPTION OF THE DRAWINGS

These and other objects are accomplished in the manner to be hereinafter described with particular reference to the drawings in which:

FIG. 1 is a front elevation of a bushing assembly machine of the present invention with various parts omitted for simplicity;

FIG. 2 is a cross-sectional view of the upper mandrel assembly of the machine shown in FIG. 1 taken along lines 2—2 thereof;

FIG. 3 is a cross-sectional view of the lower nesting assembly taken along lines 3—3 of FIG. 1;

FIGS. 4–8 show sequentially the operative steps in assembling a bushing in accordance with the teachings of the present invention; and FIG. 9 is a perspective view, partially in cross section, of an assembled Silentbloc bushing.

DETAILED DESCRIPTION OF THE INVENTION

The present invention relates to a machine as well as a method for the assembly of bushings, particularly of the Silentbloc type, said machine comprising a mandrel assembly including a mandrel permanently connected thereto, and a nesting assembly, vertically and axially aligned with one another.

Referring now to the drawings, FIG. 1 thereof shows the machine 1 in its vertical position mounted on a channel member 3 supported on an appropriate base 5. It should be noted that much of the hydraulic and pneumatic equipment as well as most of the electrical controls and motors have been omitted from the drawings for simplicity of illustration. The machine contains an upper mandrel assembly 7 and a nesting assembly 9. The upper assembly is connected by a piston 11 to a cylinder 13, either hydraulic or pneumatic, located at the upper part of the machine. This mandrel assembly is composed of an upper rubber stop 15 connected to a cross head 17 having a pair of collars, 18 slidably engaging guide rods 19. Immediately below the stop 15 is the mandrel 21, the details of which are more clearly seen in FIG. 2 and will be described later on. The nesting assembly 9 is composed of a sleeve 31 secured between a platform 33 secured to the channel member 3 and a sleeve support 35 on which the guide rods 19 are mounted. A plunger 37 (shown in outline) within said sleeve 31 is connected by a piston 39 to a lower pneumatic or hydraulic cylinder 41 bolted or otherwise securely attached to the channel 3. A pair of palm switches 43, 45 are mounted on either side of the channel, and are electrically interconnected as a safety measure whereby they must be simultaneously depressed in order to activate the assembly mechanism. A microswitch 47 immediately below palm switch 43 is positioned to be engaged by cross head 17 during the operation of the machine.

Referring now to FIG. 2, the various details of the mandrel assembly 7 can be seen in more detail. The assembly comprises a closed end pressurized cylinder 23 in which is disposed a vertically movable piston 25 connected to one end of the mandrel 21. The elongated mandrel passes through the upper rubber stop 15 connected to the cross head 17. The head 27 of the mandrel comprises a flared skirt 28 and a tip 29, the juncture therebetween forming a shoulder 26. As will be seen later on, the maximum diameter $D_1$ of the tip 29 is no greater than the internal diameter of the inner sleeve of the bushing while the maximum diameter $D_2$ of the flared skirt corresponds to the outer diameter of said sleeve. A recess 16 is provided in the upper rubber stop 15 to accommodate the flared skirt 28 of the mandrel when the mandrel is in its upper most position, and also to accommodate the flanged end of the bushing during the assembly operation. The entire mandrel assembly is attached to ram 11 (shown in FIG. 1) and is capable of moving in a vertical direction, along guide rods 19, toward or away from the nesting assembly shown in FIG. 3.

FIG. 3 shows the various details of the nesting assembly 9. This assembly comprises a relatively thick sleeve 31 mounted between platform 33 and the upper sleeve support 35. The upper portion of the sleeve contains a nest 32, conforming in shape to the outer bushing sleeve and appropriately dimensioned so as to receive and support said outer sleeve. Immediately below the nest 32 is a chamber 34 in which plunger 37, attached to piston 39, moves. Lower shoulders 36 and upper shoulders 38 define the vertical dimensions of the chamber 34 and serve to limit the vertical movement of the plunger therein. Welded to the plunger 37 is a lower rubber stop 40, consisting of an internally threaded sleeve. Adapter 42 is threaded into the sleeve and contains a positioning pin 44 secured to a base 46, the diameter of said pin being slightly smaller than the diameter of the inner bushing sleeve. In operation, this inner sleeve is placed on said positioning pin 44 and rests on said base 46. The vertical position of this inner sleeve prior to assembly can be varied within limits by virtue of the screw thread adjustment, which also allows for interchangeability of the adapter and positioning pin.

FIG. 4 shows the machine with the parts of the bushing positioned in place prior to assembly. An inner sleeve 61 is placed over the positioning pin 44 and rests upon the base 46 of the adapter 42. In the nest 32 is an outer sleeve 63 having a flange 65 at one end thereof. On top of the outer sleeve is placed an elastomeric insert 67 with an annular passageway 69 extending therethrough. It can be observed that the diameter of the insert, before assembly, is greater than that of the outer sleeve while the axial length of the insert is less than that of the inner and outer sleeves. Furthermore, the diameter of the annular passageway 69 is less than the outer diameter of the inner sleeve 61. It is understood that the component parts of the bushing can be initially placed in the respective position, either manually or automatically, and that this step of the operation does not constitute a critical element of the present invention. It should further be noted that, although, the inner sleeve 61 and outer sleeve 63, when in position for assembly, are in substantial axial alignment with one another, it is not important to position the insert on top of the outer member in such a manner that the annular passageway 69 is axially aligned with these other two components. In fact, because of the shape of the tip of the mandrel, as well as the radii of curvature at the ends of the passageway 69, the insert can be initially misaligned by as much as 20 or 30 degrees without affecting the assembly operation.

Before the palm switches are depressed, the upper mandrel assembly 7 is in the retracted, or upper position with the piston 25 and mandrel 21 at the bottom of the cylinder 23, while the bottom plunger 37 is in its lower most position in the chamber 34.

When the palm switches are pushed, the cylinder 13 (FIG. 1) is activated to cause ram 11 to move down. The entire upper mandrel assembly 7, connected to ram 11, descends and the head of the mandrel pushes through the annular passageway 69 of the insert 67 until the upper rubber stop 15 contacts the insert, as shown in FIG. 5. Without pause, the mandrel assembly continues on down with the upper stop 15 forcing the insert into the outer sleeve to form a sub-assembly. During this time, the piston 25 is held against the bottom of cylinder 23 by the air pressure behind it in the cylinder. About 40 p.s.i. is sufficient for this purpose.

As the mandrel assembly reaches the bottom of its vertical stroke, the cross head 17 thereof contacts and energizes the microswitch 47 (shown in FIG. 1) causing it to stop and reverse the movement of the assembly 7 to activate the appropriate relays to initiate upward movement of the bottom plunger 37 within the chamber 34. As seen in FIG. 6, the mandrel assembly comes to rest with the upper rubber stop in contact with the top of the sleeve 31, the tip 29 of the mandrel disposed within the inner metal sleeve 61, and the shoulder 26 resting against the end of said sleeve. As previously stated, the maximum diameter of the skirt 28 corresponds to the outer diameter of the inner sleeve 61 so as to form a peripherally continuous surface therewith. With the upper rubber stop 15 in abutment with the end of sleeve 31 the recess 16 in the rubber stop receives the flange 65 of the outer sleeve 63 and the corresponding end of the insert 67.

The bottom plunger begins its vertical upward movement at the same rate of speed that the mandrel 21 is withdrawn through the insert 67. As seen in FIG. 7, during this step of the operation the piston 25 is driven up in the cylinder 23 permitting withdrawal of the mandrel while the upper rubber stop 15 remains in contact with the end of sleeve 31 to hold the sub-assembly in place in the nest 32. The flared skirt 28 of the mandrel dilates the insert and increases the diameter of the annular passageway to permit entry of the inner sleeve 61 in thereto. With the inner sleeve properly positioned within the bushing assembly, further vertical movement is arrested when the plunger contacts the upper shoulder 38 of the chamber 34. At the same time, the flared skirt 28 of the mandrel enters the recess 16 of the upper rubber stop 15, said recess being shaped to receive said skirt.

It has been found that the use of 80 or 90 p.s.i. air pressure on an 8″ bottom cylinder will cause the piston 25 to move up in cylinder 23 having an initial confined pressure of about 40 p.s.i. and that the use of a 10″ top cylinder with 80 or 90 p.s.i. air pressure will maintain the upper rubber stop 15 in contact with the bushing and keep it in the nest until completion of the assembly.

After assembly, the lower plunger 37 returns to the bottom of the chamber 34 and the entire mandrel assembly is retracted upwardly as shown in FIG. 8. The completed bushing assembly is then removed from the machine. In FIG. 9 is shown, partially in cross section, a completed bushing of the type which can be assembled in a machine of the type covered by the present invention. The bushing comprises an elastomeric insert 67 held between an outer sleeve 63 and inner sleeve 61. The outer sleeve is provided with a head or flange 65, normally used to properly locate and position the bushing when it is installed in a motor vehicle or is otherwise put to use. One method of forming a flanged outer sleeve is to start with a metal disc, grip it securely around the periphery and form it into a cup. The bottom of the cup is then punched out. The inner sleeve, because it is relatively thick and has a small diameter cannot be readily formed by drawing. Instead, it is normally formed by rolling from a flat piece of stock.

Although the invention has been described in connection with the assembly of an elastomeric bushing wherein the inner and outer sleeves are made of metal, it is manifest that materials other than metal can be used to produce the sleeves. For example, these sleeves can be made of rigid polymeric materials. Furthermore, the outer sleeve need not conform to the contour as shown in the drawings. For instance, the flange 65 at the one end can be omitted, accompanied by a suitable adjustment in the size and dimensions of the nest and upper stop.

The insert can be made from any one of a number of elastomeric compounds utilizing techniques that are well known to the skilled rubber compounder. Elastomers such as natural rubber, neoprene, SBR, butyl rubber, co- and terpolymers of ethylene and propylene, compounded with various fillers such as carbon black and/or silica, antidegradents such as antiozonents and antioxidants, curatives and accelerators can be used.

It should be noted that an appropriate lubricant is normally sprayed or otherwise applied to the components of the bushing to facilitate the assembly thereof. After the bushing is assembled, the lubricant at the interface between the rubber and the sleeves is slowly absorbed into the rubber after which a relatively large force is required to induce slipping between component parts. To further increase the resistance to slipping, a suitable adhesive is frequently used to bond the rubber insert to one or both of said sleeves. This adhesive may be admixed with the lubricant or it may be applied to the sleeves in a separate operation. It may be an adhesive that is activated at room temperature or alternatively may require heat or other means to produce the bond.

There are various modifications that can be made in this assembly machine without deviating from the scope of the present invention. For instance, as herein described, the upper mandrel 21 is permanently attached to the piston 25 and can be replaced only by replacing the entire piston. As an alternative, a screw threaded connection can be provided by tapping a hole in the face of the piston and threading the end of the mandrel in thereto. Then one mandrel can be threadedly disengaged from the piston and quickly replaced with another mandrel.

Instead of confining the piston in a closed-end cylinder, it can be connected, through valves and solenoids to a source of pressurized air and to a vent. Thus, the cylinder above the piston can be pressurized with, say, 40 p.s.i. air to hold the piston down during the down stroke of the mandrel assembly. However, at the appropriate time, the cylinder could be temporarily disconnected from the source of air pressure and the air could be vented through a bleed valve as the piston and mandrel move up during the assembly of the inner sleeve into the bushing subassembly. As a further modification, the pressurized cylinder could be replaced with a spring which would bear down on the piston with sufficient force to bias it in its lowermost position as the mandrel passes through the rubber insert but which would yield when subjected to the force exerted by the bottom plunger during its upward stroke. As the upper mandrel assembly is returned to its normal position after completion of the assembly operation, the piston would be returned to its normal position at the bottom of the cylinder.

There are other obvious modifications that can be made in the machine without deviating from this invention. For instance, the upper air cylinders could be operated at a higher pressure than the lower cylinder to accomplish the same purpose as is achieved through the use of cylinders of different size. Furthermore, hydraulic, rather than pneumatic pressure could be used.

With further modification the apparatus could be used in the horizontal position as well as in the vertical position as shown. This would necessitate the provision of some means of holding the elastomeric insert in position prior to movement of the mandrel into the insert, and further means to insure that the outer and inner sleeves are maintained in axial alignment during the sequence of assembly. In addition, there are other modifications that could be made in the design and operation of the novel assembly machine without deviating from the scope of the invention which is defined by the claims appended hereto.

What is claimed is:

1. In a bushing assembly machine of the type used to assemble a cured annular elastomeric insert between an inner and an outer sleeve wherein said insert is first assembled into the outer sleeve and the inner sleeve is thereafter forced into the annulus of said insert, with the insert held under radial compression between said sleeves, the improvement comprising the use of a mandrel to assemble the inner sleeve into the insert, said mandrel composed of an elongated rod having a first end that is free and that comprises the head of the mandrel and a second end that is secured to a piston movable in a cylinder, the head of the mandrel composed of a frusto-conical portion having a maximum diameter substantially equal to the outer diameter of said inner sleeve, and joined to a tapered tip having a maximum diameter no larger than the inner diameter of said inner sleeve, the junction therebetween forming an abutment shoulder, the diameter of said frusto-conical portion decreasing from the juncture toward the secured end of the rod.

2. An apparatus for the assembly of a resilient bushing of the type composed of an annular elastomeric insert radially compressed between inner and outer concentric sleeves, said apparatus comprising a mandrel assembly and a nesting assembly axially aligned with and spaced from one another:
   (A) the mandrel assembly comprising:
      (1) an elongated enclosed mandrel cylinder with a piston therein;
      (2) a first abutment surface adapted to contact one end of the elastomeric insert;
      (3) a mandrel comprising an elongated rod extending through an aperture in said first abutment surface, one end of said rod being joined to said piston and the other end forming a head, said head comprising a tapered tip and a frusto-conical portion, the juncture therebetween forming a shoulder for abutment against one end of the inner sleeve, the diameter of said frusto-conical portion decreasing from said shoulder toward said aperture,
   said first abutment surface and the mandrel both capable of movement toward and away from the nesting assembly independently of one another;
   (B) the nesting assembly comprising:
      (1) an annular stationary holder for the outer sleeve of said bushing;
      (2) a plunger movable through said holder toward and away from said mandrel assembly and including:
         (a) a second insert abutment shoulder, and
         (b) a positioning pin for said inner sleeve, and
      (3) means to move said plunger toward and away from said mandrel assembly.

3. The apparatus according to claim 2 wherein the maximum diameter of the frusto-conical portion is substantially equal to the outer diameter of said inner sleeve of said bushings and the maximum diameter of the tapered tip is no greater than the inner diameter of said inner sleeve.

4. The apparatus according to claim 3 wherein the first abutment surface is formed by one end of the enclosed mandrel cylinder.

5. The assembly according to claim 4 wherein the piston is normally maintained against the end of the mandrel cylinder forming the abutment surface, by air pressure within the cylinder.

6. The apparatus according to claim 5 wherein the aperture within said first abutment surface is relieved to receive the frusto-conical portion of the mandrel.

7. The apparatus according to claim 6 wherein the entire mandrel assembly including the mandrel cylinder is operatively connected to a first fluid operated cylinder and the nesting assembly is operatively connected to a second fluid operated cylinder.

8. The apparatus according to cliam 7 wherein the fluid pressure in the second cylinder is greater than that in the mandrel cylinder, but less than that of the first cylinder.

9. The apparatus according to claim 8 wherein the mandrel assembly is joined to a platen and said platen is maintained in alignment with the nesting assembly by guide rods.

10. The apparatus according to claim 9 wherein the mandrel assembly is vertically positioned above the nesting assembly.

11. A vertical machine for assembly for a resilient bushing of the type including an annular molded elastomeric insert radially compressed between inner and outer concentric rigid sleeves wherein the components of the bushing are axially aligned but laterally displaced from one another prior to assembly, with the outer sleeve positioned between the insert and the inner sleeve, comprising:
  (A) nesting means for supporting the outer sleeve and the inner sleeve,
  (B) first plunger means vertically above the nesting means for forcing the insert through the outer sleeve to form a subassembly;
  (C) an elongated mandrel, the head of which includes a first tapered portion shaped to permit the mandrel to pass through the annulus of the insert in one direction before formation of the subassembly and a second tapered, frusto-conical portion joined to the first portion to dilate the annulus as the mandrel is withdrawn in the opposite direction; and
  (D) second plunger means vertically below the nesting means for forcing the inner sleeve into the insert while the insert is dilated during withdrawal of the mandrel.

12. The apparatus of claim 11 wherein the maximum diameter of the first tapered portion of the mandrel is smaller than the inner diameter of the inner sleeve, and the maximum diameter of the second tapered portion is approximately the same as the outer diameter of the inner sleeve.

References Cited

UNITED STATES PATENTS

| | | | |
|---|---|---|---|
| 2,660,780 | 12/1953 | Beck | 29—235 |
| 2,872,727 | 2/1959 | Sigler | 29—235 |

ROBERT C. RIORDON, Primary Examiner

J. C. PETERS, Assistant Examiner